Figure 1:
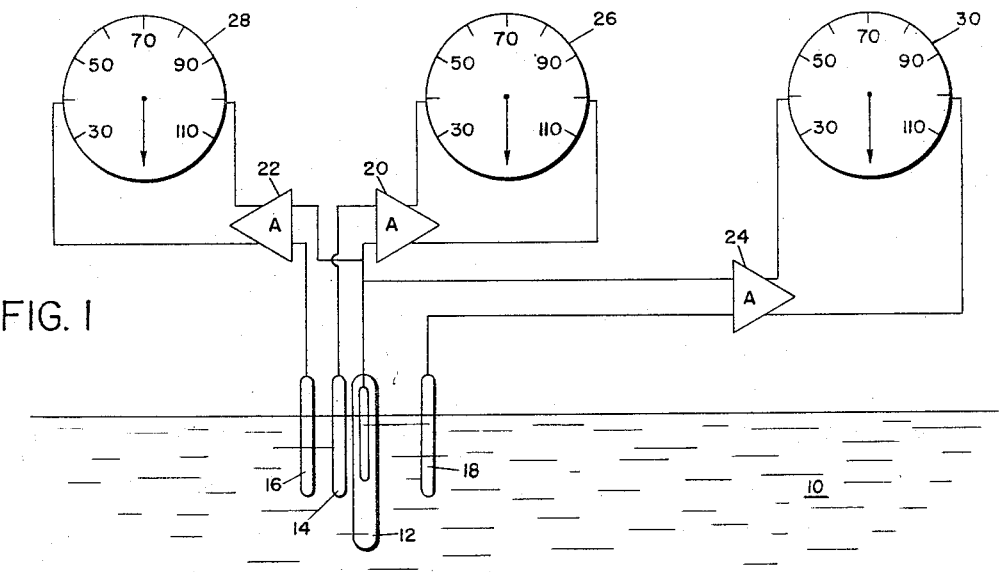

INVENTORS
WILLIAM P. BANKS,
SMITH L. HOLT, JR. &
BY RICHARD LEVERY

Dec. 27, 1966  W. P. BANKS ET AL  3,294,652
MEASUREMENT OF SULFURIC ACID AND OLEUM CONCENTRATION
Filed Feb. 25, 1963  4 Sheets-Sheet 2

INVENTORS
WILLIAM P. BANKS,
SMITH L. HOLT, JR. &
RICHARD L. EVERY
BY
*William J. Miller*
ATTORNEY

INVENTORS
WILLIAM P. BANKS
SMITH L. HOLT, JR. &
RICHARD L.E.VERY

Dec. 27, 1966   W. P. BANKS ET AL   3,294,652
MEASUREMENT OF SULFURIC ACID AND OLEUM CONCENTRATION
Filed Feb. 25, 1963   4 Sheets-Sheet 4

INVENTOR.
WILLIAM P. BANKS,
SMITH L. HOLT, JR &
BY  RICHARD L. EVERY

ATTORNEY 3,294,652
MEASUREMENT OF SULFURIC ACID AND OLEUM CONCENTRATION
William P. Banks, Ponca City, Okla., Smith L. Holt, Jr., Providence, R.I., and Richard L. Every, Ponca City, Okla., assignors to Continental Oil Company, Ponca City, Okla., a corporation of Delaware
Filed Feb. 25, 1963, Ser. No. 260,803
15 Claims. (Cl. 204—1)

This invention relates to the measurement of the concentration of sulfuric acid and oleum (fuming sulfuric acid) solutions. More particularly, the present invention relates to a method and apparatus for continuously measuring the concentration of sulfuric acid and oleum solutions as the concentration of such solutions varies.

In the manufacture of sulfuric acid and oleum, it is necessary to be constantly apprised of the concentration of the acid as it is being blended up or down to a specific concentration or range of concentrations. Since the more easily measured properties of oleum and concentrated sulfuric acid are almost identical, it has not been possible to refer to these properties as an indicator of variation in the concentration of these materials, and particularly, of the concentration transition in blending from concentrated sulfuric acid to oleum and vice versa.

It is an object of the present invention to provide a method and apparatus for registering variations in concentration in sulfuric acid and oleum solutions.

Another object of the invention is to permit variations in the concentration of sulfuric acid and oleum to be constantly monitored, and control of such variations to be constantly and automatically maintained.

A further object of the invention is to provide novel electrochemical systems which may be utilized to monitor and automatically control variations in the concentration of sulfuric acid and oleum solutions.

It has heretofore been known that certain types of electrodes may be utilized in conjunction with a standard reference electrode to develop a potential difference when the electrodes are placed in certain solutions or mixtures, which potential difference varies in correspondence to variations in the concentration of a particular ion which is present in the solution or mixture. The variation of the electrical potential of the electrode which is used conjunctively with the standard electrode is pronounced, continuous and predictable so that continuous monitoring of concentration changes may be attained. In United States Patent 2,526,857 to Chaney, for example, a silver electrode is employed in combination with a reference electrode, such as a saturated calomel electrode, for constantly measuring the chloride ion content of drilling mud. More recently, Laird and Wyllie have described a method for determining the concentration of certain ions present in variable quantities in drilling muds by employing electrodes which are reversible with respect to a particular ion. Thus, a silver-silver halide electrode is used conjunctively with a standard calomel electrode for measuring the concentration of halide ions, such as the chloride and bromide ions, and a lead-lead sulfate electrode is provided for measuring the concentration of sulfate ions in the drilling fluid.

We have now discovered that the concentration of strong sulfuric acid and oleum may be accurately, continuously and automatically determined by employing two electrode types which respond repeatedly in the same manner, and therefore predictably, to changes in the concentration of these materials. The electrical potential of each of these electrodes changes markedly over certain relatively wide concentration ranges so that even slight changes in solution concentration are easily detected by pronounced change in the self-potential developed between the electrodes and a standard electrode, such as a calomel half-cell. Moreover, the concentration ranges over which the potential of each of the two electrodes is most responsive, is different, and the two ranges tend to complement each other so that by using both electrodes simultaneously, sulfuric acid concentrations ranging from 60 percent through 107 percent (approximately 33 percent free $SO_3$) can be continuously and accurately monitored. Although use of lead-lead sulfate electrodes for measuring sulfate ion concentration is known, as hereinbefore pointed out, it is also within the scope of the present invention to use such an electrode in combination with the two electrode types described above to extend the range of concentration measurement to sulfuric acid having a concentration between 30 and 60 percent. Moreover, the use of the three electrodes conjunctively increases the accuracy and sensitivity with which changes in the concentration of the acid may be detected.

The two electrodes which we have found to be sensitive to changes in the concentration of concentrated and fuming sulfuric acid are a platinum-platinum oxide electrode, and a chromium carbide electrode. The preparation of the platinum-platinum oxide electrode is disclosed in a copending application, Serial No. 260,804, filed February 25, 1963, now abandoned. The potential of the former electrode changes sharply but reproducibly in acid concentrations ranging from about 90 percent through 107 percent (approximately 33 percent free $SO_3$). The chromium carbide electrode, on the other hand, commences to vary markedly in potential at an acid concentration of 60 percent.

In addition to permitting sulfuric acid concentration to be continuously monitored, suitable instrumentation can be provided to permit variations in the potential difference developed between the descrbed electrodes and a reference standard electrode to be converted to control signals for controlling proportioning or blending devices used in suufuric acid production or in processes utilizing sulfuric acid of specific concentration.

Other advantages and objects of the present invention will be perceived from a reading of the following detailed description of the invention in conjunction with a perusal of the drawings which illustrate our invention.

Figure 2:
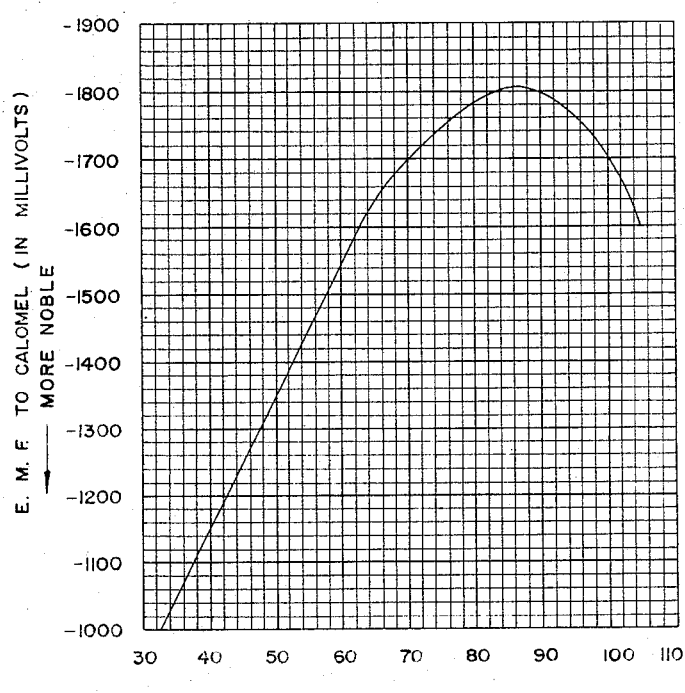
Figure 4:
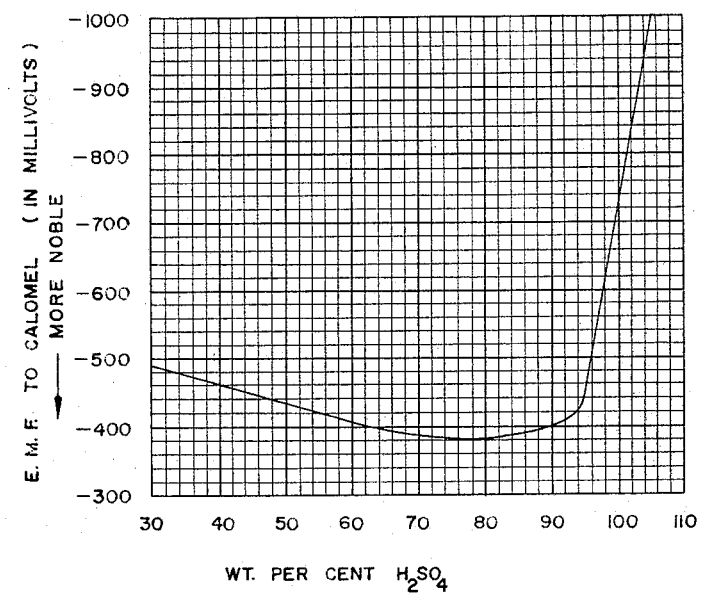
Figure 3:
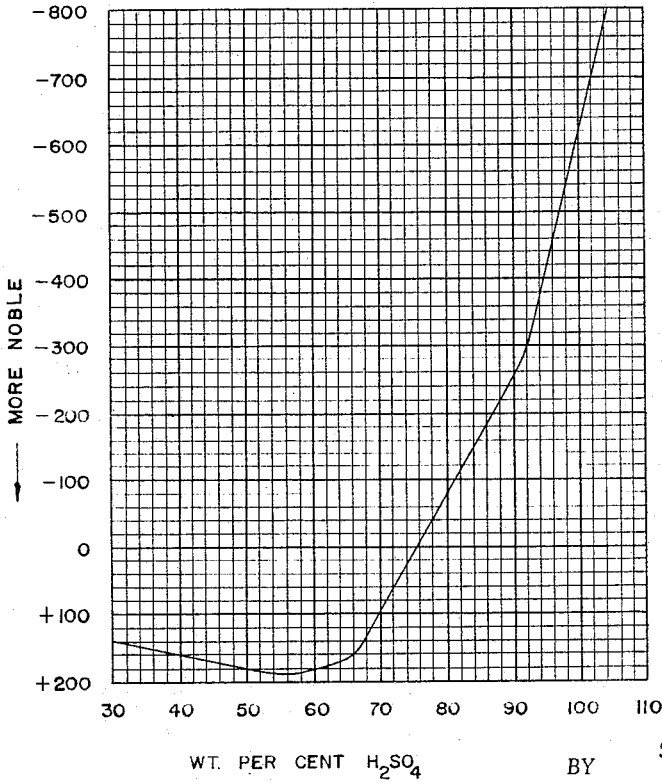
Figure 5:
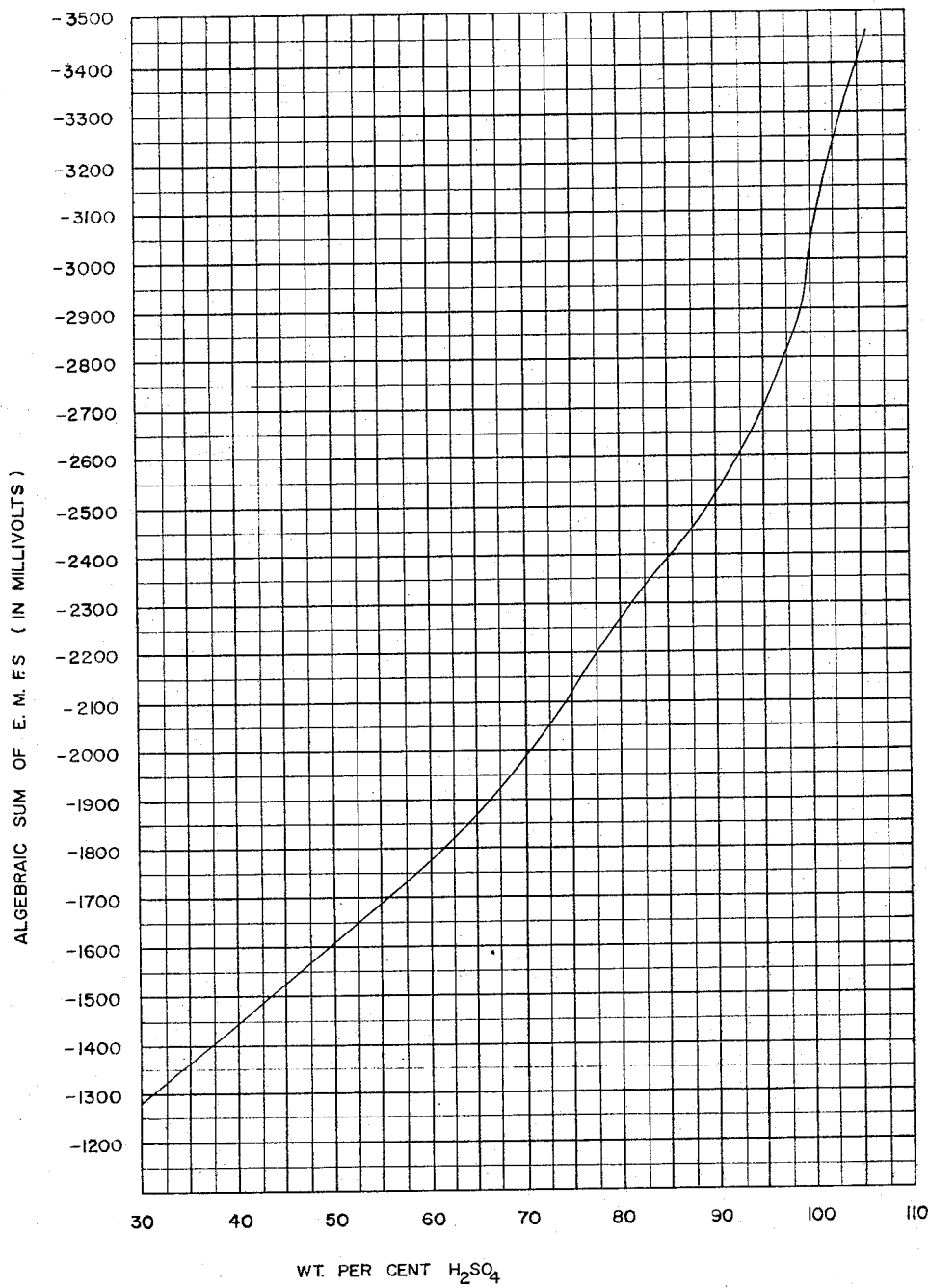
Figure 6:
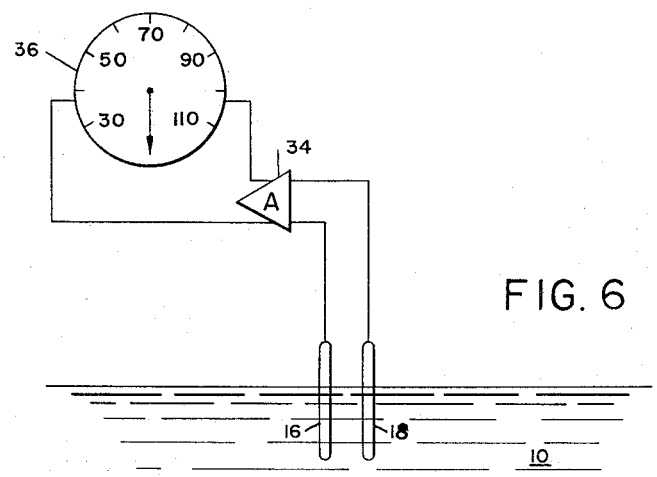
Figure 7:
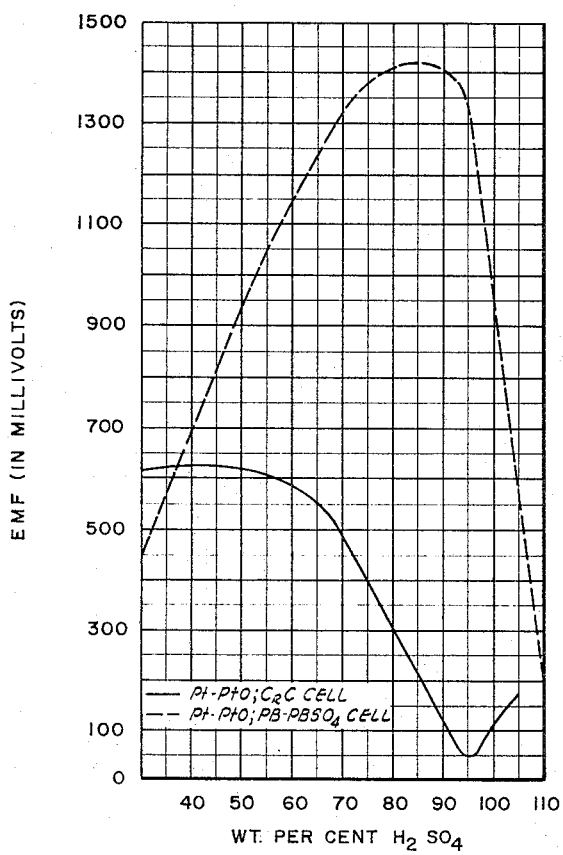

In the drawings:
FIGURE 1 diagrammatically illustrates measuring circuitry embodying the invention.
FIGURES 2, 3 and 4 are graphs in which potential is plotted against concentration for the E.M.F. developed between a saturated calomel electrode and lead-lead sulfate, chromium carbide and platinum-platinum oxide electrodes, respectively, when all of said electrodes are placed in electrochemical contact with sulfuric acid of varying concentration.
FIGURE 5 is a graph illustrating the manner in which the algebraic sum of the potentials developed between the several measuring electrodes and the reference electrode may be utilized to determine the concentration of a sulfuric acid or oleum solution in which the electrodes are immersed.
FIGURE 6 is a diagrammatic illustration of an alternative embodiment of the invention.
FIGURE 7 is a graph in which the potentials measured by the embodiment of the invention shown in FIGURE 6 are plotted against acid concentration. One of the curves is derived from the use of a platinum-platinum oxide electrode conjunctively with a chromium carbide electrode to measure acid concentration. The other curve is derived from the conjunctive use of the platinum-platinum oxide and lead-lead sulfate electrodes for such measurement.

Referring now to the drawings in detail, and particularly to FIGURE 1, reference character 10 designates a sulfuric acid or oleum solution, the concentration of which it is desired to monitor. A saturated calomel electrode 12 is placed in electrical communication with the acid 10. A lead-lead sulfate electrode 14, a chromium carbide electrode 16 and a platinum-platinum oxide electrode 18 are partially immersed in the acid and are preferably substantially equidistantly spaced from the calomel reference electrode 12.

Each of the measuring electrodes 14, 16 and 18 is connected to one of the inputs of direct current amplifiers 20, 22 and 24, respectively, and the other input of each of the amplifiers is connected to the calomel reference electrode 12. Thus, the potential which is developed between the calomel reference electrode 12 and each of the three measuring electrodes 14, 16 and 18 is applied to the respective amplifiers 20, 22 and 24. The output from each of the amplifiers 20, 22 and 24 is fed to a suitable measuring instrument, such as the high resistance recording potentiometers 26, 28 and 30 shown connected to the amplifiers 20, 22 and 24, respectively. As an alternative to the use of the potentiometers, ammeters may be used to reflect potential changes, provided the circuit resistances remain constant. Other instruments suitable for measuring and indicating the potential developed between the reference and measuring electrodes will be well known to those skilled in the art.

The manner in which the system illustrated in FIGURE 1 is employed for monitoring changes in the concentration of the sulfuric acid 10 may best be understood if explained in conjunction with a discussion of FIGURES 2, 3 and 4. FIGURE 2 graphically illustrates the manner in which the E.M.F. developed between the calomel reference electrode and a lead-lead sulfate electrode varies as the concentration of a sulfuric acid solution with which these electrodes are in electrochemical contact varies. It will be perceived that a marked change occurs in the developed potential as the concentration of the acid is varied from 30 percent to about 64 percent. At this point, the potential begins to show a lesser change with increasing acid concentration. This trend continues until between 82 percent and 90 percent acid concentration is reached, at which point only a very slight change in potential occurs, and the potential begins to become slightly more positive with increasing acid concentration. As the acid concentration is further increased, the change of the potential in the positive direction increases more rapidly.

These variations of potential with concentration as plotted in FIGURE 2 are, in the operation of the system illustrated in FIGURE 1, measured and indicated by the recording potentiometer 26. Since the curve shown in FIGURE 2 is reproducible and will always be of substantially the same configuration, the potentiometer 26 may be calibrated directly in acid concentration rather than in millivolts according to the usual practice.

It will be perceived in referring to FIGURE 2 that between about 62 percent and 106 percent acid concentration, each potential developed between the calomel reference electrode and the lead-lead sulfate electrode may correspond to either of two acid concentration values. For example, a potential of −1700 millivolts indicates that the concentration of the acid is either about 70 percent or about 100.5 percent. From this one potential reading it is not possible to determine which value represents the true concentration of the acid. Also, the peaking of the potential curve at 86 percent acid concentration renders accurate correlation of the potential and acid concentration in the vicinity of this concentration difficult. Further, we have observed that the lead-lead sulfate electrode is slowly soluble in acid concentrations exceeding 45 percent and that therefore some slight instability in the potential developed at higher acid concentrations may be expected to occur over extended periods of use.

In FIGURE 4 of the drawings, the manner in which the potential developed between the platinum-platinum oxide electrode and the calomel reference electrode varies with variations in the acid concentration has been illustrated graphically. The slope of the curve is relatively flat until the concentration of the acid reaches about 92 percent. At this point, the E.M.F. commences to change rapidly in the more active direction as the acid concentration continues to increase. The sharp change of potential with relatively slight changes in acid concentration continues until the maximum concentration of the acid is attained.

It will again be perceived that in passing through a minimum, the potential curve of FIGURE 4 indicates that two different acid concentrations within the range of 30 percent to 98 percent will yield the same potential reading. Thus, the input of a given potential to the potentiometer 30 will necessarily indicate that one of two acid concentrations obtains in the solution 10, but will not indicate which of the two possible concentrations is actually the true concentration.

The same remarks which have been made with respect to FIGURES 2 and 4 also apply to FIGURE 3 which shows the manner in which the potential developed between the chromium carbide electrode 16 and the calomel reference electrode 12 varies with concentration. Here the potential curve passes through a minimum at an acid concentration of about 56 percent, and the curve has a relatively flat slope between 30 percent and 66 percent.

In the case of both the platinum-platinum oxide and chromium carbide electrodes, it may be perceived that the acid concentration can be accurately determined over an acid concentration range in which the developed potential changes by an amount of at least 150 millivolts for each change of 10 weight percent in the concentration of the acid.

In using the apparatus illustrated in FIGURE 1, each of the potentiometers 26, 28 and 30 will register either one or two acid concentrations at all times as the concentration of the acid 10 with which the electrodes are in contact is varied between 30 percent and 106 percent. As previously indicated, the potentiometers 26, 28 and 30 are preferably calibrated in acid concentration rather than in millivolts. Thus, for example, at an actual acid concentration of, say, 62 percent, potentiometer 26 will indicate the acid concentration to be either 62 percent or 104 percent. Potentiometer 28 will indicate the acid concentration to be either 62 percent or 46 percent. Potentiometer 30 will indicate the acid concentration to be either 62 percent or 89 percent. Since the concentration value which is common to all of the potentiometers is 62 percent, an operator is enabled to realize that this is the true acid concentration at the time of such readings.

In order to improve the accuracy of the concentration determination when the simple arrangement illustrated in FIGURE 1 is employed, suitable indicia may be provided on the potentiometers 26, 28 and 30 to indicate that the concentration readings on only potentiometers 28 and 30 are to be averaged when concentrations between 80 percent and 94 percent are indicated, thus eliminating the inaccuracies in the concentration registered by potentiometer 26 within this range as a result of the maximum through which the lead-lead sulfate potential curve passes at about 86 percent acid concentrations. The indicia on the potentiometers may likewise indicate that between 66 percent and 80 percent acid concentration, only the readings of potentiometers 26 and 28 are to be averaged, and that below 66 percent, the reading of potentiometer 26 alone is to be taken as the true acid concentration. Of course, in this lower range of acid concentrations, the readings on potentiometers 28 and 30 should still be observed in order to check the lead-lead sulfate electrode circuit (which includes the potentiometer 26) against malfunction and the slight instability which characterizes the lead-lead sulfate electrode after extended periods of use in acid concentrations exceeding 45 percent.

It is appreciated that many much more sophisticated electrical and electronic systems than that shown in FIGURE 1 may be developed for utilizing the potential developed between the calomel reference electrode 12 and the three measuring electrodes 14, 16 and 18 to measure the concentration of sulfuric acid. Such systems, however, are almost certain to rely upon the same basic principles of potential measurement hereinbefore described, and since the manner in which they may be constructed is well known in the art and involves no inventive faculty, it is not proposed to detail their construction in this application.

One further aspect of the present invention should, however, be mentioned. As is well known in the art, electrical potentials may be algebraically combined, and devices for accomplishing such algebraic addition of voltages are widely used in various applications. Because of the complementary nature of the potentials which are developed between the calomel reference electrode 12 and the several measuring electrodes 14, 16 and 18 of this invention, such a potential adding device may be used to good advantage in permitting the concentration of a sulfuric acid or oleum soluation to be constantly monitored. A device of this type may also be used for achieving constant control during blending or manufacturing of the acid, and also during processes employing sulfuric acid and depending upon a controlled variation of acid concentration.

The manner in which the algebraic sum of the potentials developed between the calomel reference electrode and the three measuring electrodes varies with concentration is graphically illustrated in FIGURE 5 of the drawings. It will be perceived in referring to FIGURE 5 that over the entire concentration range of from 30 to 106 percent, a relatively large change is effected in the algebraic sum of the potentials for a relatively small corresponding change in acid concentration. The possibility therefore exists of using a suitable device which is adapted to algebraically add the potentials developed between the reference electrode 12 and the measuring electrodes 14, 16 and 18 to generate an electrical signal which may be used to operate such control devices as motor valves, solenoid valves, proportioning pumps, etc., for the purpose of continuously controlling the concentration of sulfuric acid or oleum as these materials are being manufactured, or as they are being used in various processes.

As an alternative to the use of the measuring electrodes in conjunction with the calomel reference electrode, a pair of the measuring electrodes may be used to form an electrochemical cell, such as that depicted in FIGURE 6. In this figure, the chromium carbide electrode 16 and the platinum-platinum oxide electrode are shown immersed in the acid 10 and are connected to each other through an amplifier 34 and a high resistance recording potentiometer 36, ammeter or other suitable measuring device. Since the potentials of both these electrodes vary in a predictable manner as the acid concentration varies, the potential of the cell formed by the two interconnected reference electrodes will also vary in a predictable manner. A plot of the E.M.F. developed by the cell against acid concentration is illustrated in FIGURE 7.

It will be apparent that an arrangement similar to that shown in FIGURE 6, except using the lead-lead sulfate electrode with either the chromium carbide or platinum-platinum oxide electrode, could also be employed to accurately measure the acid concentration. FIGURE 7 also illustrates the graph obtained when the E.M.F. developed by a platinum-platinum oxide, lead-lead sulfate cell is plotted against acid concentration.

No further description of the invention is believed necessary for a full and complete understanding thereof by those skilled in the art, it being apparent from the foregoing description that the present invention may be adapted to a number of uses based upon the measurement of sulfuric acid and oleum concentrations. Many modifications and variations may be made with respect to certain structural details of the apparatus which is utilized conjunctively with the electrodes hereinbefore described and all directed toward the useful employment of the varying potential developed by such electrodes when immersed in sulfuric acid. Insofar as such modifications and variations continue to rely upon the basic principles of the invention hereinbefore enumerated, it is intended that these changes be encompassed by the spirit and scope of the present invention, except as the same may be necessarily limited by the appended claims.

We claim:

1. A method of measuring the concentration of sulfuric acid above a concentration of about 92 weight percent comprising:
   (a) placing a reference electrode of constant potential in electrochemical communication with said acid;
   (b) placing a platinum-platinum oxide electrode in contact with said acid;
   (c) measuring the potential difference between said electrodes; and
   (d) converting the potential difference measurement to a concentration measurement.

2. A method of measuring the concentration of sulfuric acid above a concentration of about 66 weight percent comprising:
   (a) placing a reference electrode of constant potential in electrochemical communication with said acid;
   (b) placing a chromium carbide electrode in contact with said acid;
   (c) measuring the potential difference between said electrodes; and
   (d) converting the potential difference measurement to a concentration measurement.

3. A method for measuring the concentration of oleum comprising:
   (a) placing a reference electrode of constant potential in electrochemical communication with the oleum;
   (b) placing a platinum-platinum oxide electrode in contact with the oleum;
   (c) measuring the potential difference between said electrodes; and
   (d) converting the potential difference measurement to a concentration measurement.

4. A method of measuring the concentration of oleum comprising:
   (a) placing a reference electrode of constant potential in electrochemical communication with the oleum;
   (b) placing a chromium carbide electrode in contact with the oleum;
   (c) measuring the potential difference between said electrodes; and
   (d) converting the potential difference measurement to a concentration measurement.

5. A method of monitoring changes in the concentration of sulfuric acid ranging from about 30 percent to about 106 percent comprising:
   (a) measuring changes in the potential difference developed between a lead-lead sulfate electrode and a reference electrode each placed in electrochemical communication with said acid during changes in the concentration of said acid;
   (b) measuring changes in the potential difference developed between a platinum-platinum oxide electrode placed in electrochemical communication with said acid and said reference electrode during changes in the concentration of said acid;

(c) measuring changes in the potential difference developed between a chromium carbide electrode placed in electrochemical communication with said acid and said reference electrode during changes in the concentration of said acid; and (d) correlating said measurements to determine the concentration of said acid at all times.

6. Apparatus for measuring the concentration of sulfuric acid comprising:
   (a) a reference electrode of constant potential in electrochemical contact with said acid;
   (b) a chromium carbide electrode in contact with said acid; and
   (c) means for measuring the potential difference between said chromium carbide electrode and said reference electrode, said measuring means being calibrated in acid concentration values whereby the concentration of the sulfuric acid may be determined directly from said measuring means.

7. Apparatus as claimed in claim 6 wherein said means for measuring the potential difference between said chromium carbide electrode and said reference electrode comprises:
   (a) an amplifier connected across said electrodes, and
   (b) an ammeter connected to the output of said amplifier and calibrated in acid concentration values.

8. Apparatus for measuring the concentration of sulfuric acid solutions ranging in concentration from 30 percent to 106 percent comprising:
   (a) a reference electrode of substantially constant potential in electrochemical contact with the acid solution, the concentration of which is to be measured;
   (b) a lead-lead sulfate electrode in contact with said acid solution;
   (c) a chromium carbide electrode in contact with said acid solution;
   (d) a platinum-platinum oxide electrode in contact with said acid solution;
   (e) means for registering the potential developed between said reference electrode and each of said other electrodes; and
   (f) means connected to said potential registering means and responsive thereto for algebraically combining said registered potentials.

9. A method of measuring the concentration of sulfuric acid at concentrations exceeding 30 weight percent comprising:
   (a) placing a lead-lead sulfate electrode in direct contact with said acid;
   (b) placing a second electrode selected from the group consisting of platinum-platinum oxide electrode and a chromium carbide electrode; and
   (c) measuring the potential difference between said electrodes; and
   (d) converting said potential difference measurement to a concentration measurement.

10. Apparatus for measuring the concentration of sulfuric acid comprising:
    (a) a chromium carbide electrode in contact with said acid;
    (b) a lead-lead sulfate electrode in contact with said acid; and
    (c) means for measuring the potential difference between said electrodes, said means being calibrated in acid concentration values.

11. Apparatus for measuring the concentration of sulfuric acid comprising:
    (a) a platinum-platinum oxide electrode in contact with said acid;
    (b) a lead-lead sulfate electrode in contact with said acid; and
    (c) means for measuring the potential difference between said electrodes, said measuring means being calibrated in acid concentration values.

12. Apparatus for measuring the concentration of sulfuric acid comprising:
    (a) a platinum-platinum oxide electrode in contact with said acid;
    (b) a chromium carbide electrode in contact with said acid; and
    (c) means for measuring the potential difference between said electrodes, said measuring means being calibrated in acid concentration values.

13. Apparatus for measuring the concentration of sulfuric acid comprising:
    (a) two different spaced electrodes in direct contact with said acid and selected from the group consisting of a platinum-platinum oxide electrode, a chromium carbide electrode and a lead-lead sulfate electrode; and
    (b) means for measuring the potential difference between the two electrodes, said measuring means being calibrated in acid concentration values.

14. A method for measuring the concentration of sulfuric acid over certain ranges comprising:
    (a) placing a reference electrode of constant potential in electrochemical communication with said acid;
    (b) placing an electrode selected from the group consisting of a platinum-platinum oxide electrode and a chromium carbide electrode in contact with said acid; and
    (c) measuring the potential difference between said electrodes when said potential difference varies over a range exceeding 150 millivolts for each 10 weight percent change in acid concentration.

15. A method of measuring the concentration of sulfuric acid at concentrations between about 60 and about 90 weight percent comprising:
    (a) placing a chromium carbide electrode and a platinum-platinum oxide electrode in electromechanical communication with said acid;
    (b) measuring the potential difference between said electrodes; and
    (c) converting the potential difference measurement to a concentration measurement.

References Cited by the Examiner

UNITED STATES PATENTS 2,912,367  11/1959  Asendorf et al. _____ 204—1
2,930,967   3/1960  Laird et al. _____ 204—195

OTHER REFERENCES

Ives et al.: "Reference Electrode" (1961), page 397.
Lewis et al.: "J. of Am. Chem. Soc.," volume 39 (1917) (pages 1906–1912).

JOHN H. MACK, *Primary Examiner.*

T. TUNG, *Assistant Examiner.*